United States Patent
Kim et al.

(10) Patent No.: US 9,123,956 B2
(45) Date of Patent: Sep. 1, 2015

(54) CELL BARRIER FOR SECONDARY BATTERY MODULE AND SECONDARY BATTERY MODULE

(75) Inventors: Tae-Yong Kim, Yongin-si (KR);
Yoon-Cheol Jeon, Yongin-si (KR);
Gun-Goo Lee, Yongin-si (KR);
Soo-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 807 days.

(21) Appl. No.: 11/701,455

(22) Filed: Feb. 2, 2007

(65) Prior Publication Data

US 2007/0178377 A1     Aug. 2, 2007

(30) Foreign Application Priority Data

Feb. 2, 2006   (KR) .................. 10-2006-0009961

(51) Int. Cl.
| H01M 2/18 | (2006.01) |
| H01M 10/02 | (2006.01) |
| H01M 10/26 | (2006.01) |
| H01M 6/46 | (2006.01) |
| H01M 2/02 | (2006.01) |
| H01M 2/20 | (2006.01) |

(Continued)

(52) U.S. Cl.
CPC ............. *H01M 6/46* (2013.01); *H01M 2/021* (2013.01); *H01M 2/18* (2013.01); *H01M 2/202* (2013.01); *H01M 10/5004* (2013.01); *H01M 10/504* (2013.01); *H01M 10/5059* (2013.01); *H01M 10/5067* (2013.01); *Y10T 428/31678* (2015.04)

(58) Field of Classification Search
CPC ......... H01M 6/46; H01M 2/021; H01M 2/18; H01M 2/202; H01M 10/5004; H01M 10/504; H01M 10/5059; H01M 10/5067
USPC .......... 429/32, 181, 152, 130, 149, 157, 120, 429/156, 53, 176, 345; 428/469, 457; 148/1.5

See application file for complete search history.

(56) References Cited

U.S. PATENT DOCUMENTS 2,071,469 A * 2/1937 Lormor .................. 429/82
2,273,244 A * 2/1942 Ambruster ............. 429/71

(Continued)

FOREIGN PATENT DOCUMENTS

| CN | 1441505 | 9/2003 |
| CN | 1607704 A * | 4/2005 |

(Continued)

OTHER PUBLICATIONS

Machine translation of JP 2004-362879, Takagi et al., Dec. 2004.*

(Continued)

*Primary Examiner* — Kenneth Douyette
(74) *Attorney, Agent, or Firm* — Christie, Parker & Hale, LLP (57) ABSTRACT

The cell barrier for a rechargeable battery module of the present invention includes a metal body and an insulating layer disposed on the surface of the metal body. The cell barrier is interposed between unit cells to electrically insulate between the unit cells. The insulating layer is selected from the group consisting of a resin layer, an inorganic oxide layer, an anodized layer, and a composite layer thereof. The cell barrier also has channels to provide for additional cooling by a heat transfer medium. A single unit cell can also be used with a cell barrier disposed along the unit cell for insulation and cooling.

7 Claims, 6 Drawing Sheets

(51) Int. Cl.
*H01M 10/613* (2014.01)
*H01M 10/653* (2014.01)
*H01M 10/6557* (2014.01)
*H01M 10/6563* (2014.01)

(56) References Cited

U.S. PATENT DOCUMENTS

| | | | | |
|---|---|---|---|---|
| 3,531,327 | A * | 9/1970 | Moos | 429/406 |
| 3,537,907 | A * | 11/1970 | Wilson | 429/120 |
| 3,832,237 | A * | 8/1974 | Kinsey | 429/49 |
| 4,247,343 | A * | 1/1981 | Kruzhanov et al. | 438/332 |
| 4,567,121 | A * | 1/1986 | Gilmour | 429/181 |
| 5,131,559 | A * | 7/1992 | Ariyoshi et al. | 220/555 |
| 5,663,008 | A * | 9/1997 | Shimakawa et al. | 429/443 |
| 5,695,891 | A | 12/1997 | Misra et al. | |
| 5,817,434 | A * | 10/1998 | Brooker et al. | 429/49 |
| 6,645,668 | B2 * | 11/2003 | Etou | 429/153 |
| 6,819,081 | B2 * | 11/2004 | Izawa et al. | 320/107 |
| 2002/0012833 | A1 * | 1/2002 | Gow et al. | 429/120 |
| 2003/0129487 | A1 | 7/2003 | Inoue et al. | |
| 2004/0142238 | A1 * | 7/2004 | Asahina et al. | 429/176 |
| 2004/0197647 | A1 * | 10/2004 | Murashige et al. | 429/185 |
| 2005/0153188 | A1 * | 7/2005 | Schenk et al. | 429/32 |
| 2005/0156478 | A1 * | 7/2005 | Berghanel et al. | 310/242 |
| 2005/0287426 | A1 * | 12/2005 | Kim et al. | 429/149 |
| 2006/0246348 | A1 * | 11/2006 | Hamada et al. | 429/148 |

FOREIGN PATENT DOCUMENTS

| | | |
|---|---|---|
| EP | 1 059 679 A2 | 12/2000 |
| EP | 1 117 138 A1 | 7/2001 |
| EP | 1 059 679 A3 | 9/2002 |
| JP | 08-321329 | 12/1996 |
| JP | 9-245753 | 9/1997 |
| JP | 10-302734 | 11/1998 |
| JP | 2000-106152 | 4/2000 |
| JP | 2000-106215 | 4/2000 |
| JP | 2000-315482 | 11/2000 |
| JP | 2001-196103 | 7/2001 |
| JP | 2004-227788 | 8/2004 |
| JP | 2004-362879 | 12/2004 |
| JP | 2004-362879 A * | 12/2004 ... H01M 2/10 |
| KR | 2006-118797 | 11/2006 |
| WO | WO 00/11730 | 3/2000 |

OTHER PUBLICATIONS

"Electrical insulation for rotating machines: design, evaluation, aging, testing, and repair", vol. 13 of IEEE Press series on power engineering, Wiley-IEEE 2004, Stone et al., p. 76.*

Hagedorn, H., "Synthetic Resin Grouted Tube Anchors", Rock Mechanics and Rock Engineering 16, 143, 1983.*

SIPO Office Action dated Apr. 26, 2012, for corresponding Chinese Patent application 200710007945.6, with English translation of text, 5 pages.*

European Search Report dated Jan. 8, 2008 of the corresponding European Application No. 07101411.2.

Japanese Office action dated Jun. 22, 2010, for corresponding Japanese Patent application 2006-313382.

Japanese Office Action issued Feb. 2, 2010, in corresponding Japanese Patent Application No. 2006-313382.

SIPO Office action dated Jun. 20, 2011, for corresponding Chinese Patent application 200710007945.6, with English translation, 10 pages.

European Search Report dated Jun. 30, 2011, for corresponding European Patent application 07101411.2, 3 pages.

SIPO Office action dated Oct. 30, 2012 for corresponding Chinese Patent application 200710007945.6, with English translation, (10 pages).

SIPO Office action dated Jun. 5, 2013, with English translation, for corresponding Chinese Patent application 200710007945.6, (15 pages).

SIPO Office action dated Dec. 2, 2013, for corresponding. Chinese Patent application 200710007945.6 (3 pages), and English Translation (5 pages).

SIPO Office action dated Apr. 17, 2014, with English translation, for corresponding Chinese Patent application 200710007945.6, (17 pages).

SIPO Office action dated Jul. 29, 2014, with English translation, for corresponding Chinese Patent application 200710007945.6, (7 pages).

* cited by examiner

CELL BARRIER FOR SECONDARY BATTERY MODULE AND SECONDARY BATTERY MODULE

CROSS-REFERENCE TO RELATED APPLICATION

This application claims priority to and the benefit of Korean Patent Application No. 2006-9961 filed in the Korean Intellectual Property Office on Feb. 2, 2006, the entire content of which is incorporated herein by reference.

BACKGROUND OF THE INVENTION

1. Field of the Invention

Aspects of the present invention relates to a cell barrier for a rechargeable battery module and a rechargeable battery module including the same. More particularly, the present invention relates to a cell barrier having improved insulating properties and cooling performance, as well as increased mechanical properties such as anti-corrosion, abrasion resistance, hardness, and so on. Aspects of the present invention also relate to a rechargeable battery module including the cell barrier and to the rechargeable battery or unit cell component of the rechargeable battery module.

2. Description of the Related Art

Recently, researchers have been developing high-power rechargeable batteries using a non-aqueous electrolyte having a high energy density. Such high power rechargeable batteries are formed of a plurality of battery cells connected to each other in series so as to be used as a power source for driving a motor in a device requiring high power, such as an electric vehicle.

A rechargeable battery (hereinafter, referred to as a unit cell for convenience) can be fabricated in various shapes, for example, cylinders, prisms, and the like. Unit cells are generally coupled in series to form a module that is composed of a plurality of unit cells.

Each unit cell includes: an electrode assembly including a positive electrode and a negative electrode with a separator interposed between them; a case having a space for housing the electrode assembly; a cap assembly combined with the case to seal the case in an airtight fashion; and a positive terminal and a negative terminal that protrude from the cap assembly and are electrically coupled to the positive and negative electrodes, respectively.

In general, the case is formed of a metal capable of efficiently dissipating heat generated from a unit cell. Accordingly, the metal should have excellent electrical conductivity as well as excellent thermal conductivity.

The unit cells are electrically coupled to each other by mounting a connector between threaded positive and negative terminals and then fastening the connector to the terminal with nuts.

In a rechargeable battery module, cell barriers for heat transfer are interposed between unit cells such that air flows through the cell barriers to cool the unit cells.

The information disclosed in this background section, above, is intended only to enhance understanding of the background of the invention. Therefore, the background section may contain information that does not constitute prior art known in this country to a person of ordinary skill in the art.

SUMMARY OF THE INVENTION

One embodiment of the present invention provides a cell barrier for a rechargeable battery module where the cell barrier has excellent cooling properties and insulating performance, as well as good mechanical properties.

Another embodiment of the present invention provides a rechargeable battery module that includes the cell barrier for the rechargeable battery module.

According to another embodiment of the present invention, the cell barrier for a rechargeable battery module includes a metal body and an insulating layer formed on the surface of the metal body. The cell barrier is interposed between unit cells to electrically insulate between adjacent unit cells. The insulating layer is selected from the group consisting of a resin layer, an inorganic oxide layer, an anodized layer, and a composite layer thereof.

According to another embodiment of the present invention, the cell barrier provides for further insulation by providing channels for passage of a heat transfer medium along the metal body and the insulating layer. The channels can be provided by forming the cell barrier in a corrugated shape, although the channels can be created by other shapes and structures as well.

According to another embodiment of the present invention, a unit cell is provided for generation of electricity. The unit cell contains an electrode assembly comprising a positive electrode, a negative electrode, and a separator insulating the electrodes from each other. The unit cell further comprises a case for housing the electrode assembly, a cap plate connected to the case sealing the electrode assembly in the case, and positive and negative electrode terminals connected to the positive and negative electrodes, respectively, and protruding through the cap plate. The above cell barrier is disposed along one side of the unit cell, or as discussed above, between unit cells, to provide cooling and insulation.

According to another embodiment of the present invention, the rechargeable battery module includes a plurality of unit cells electrically coupled to each other while leaving a certain space between the unit cells. The above cell barrier is disposed between the unit cells.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

In a rechargeable battery module, unit cells generate significant heat internally during repeated charges and discharges. When the heat generated from the unit cells is not dissipated, unit cell performance may deteriorate.

Accordingly, a cell barrier must have sufficient cooling performance to effectively dissipate the heat. Research into the structure and material of a cell barrier having improved cooling performance is being actively pursued.

Further, the unit cells should be electrically coupled only via a connector because there is concern that a short circuit might be caused if a unit cell is electrically coupled to the case of an adjacent unit cell.

Conventionally, an insulating layer is interposed between the unit cells for this purpose. However, such a conventional structure causes problems in that excessive insulating layer is required while it is difficult to dissipate the heat via the cell barrier because of the low thermal conductivity of the insulating material.

A cell barrier according to an aspect of the present invention is mounted in a unit cell to improve the cooling performance and the insulating properties of the cell barrier. It is interposed between unit cells to provide a passage for heat transfer from the unit cell to another medium. The cell barrier includes a metal body and an insulating layer formed on the surface of the metal body. The insulating layer may be selected from the group consisting of a resin layer, an inorganic oxide layer, an anodized layer, and a composite layer thereof.

The metal body may include aluminum and/or aluminum alloys. Aluminum is ideal because it is easily shaped, cut and processed. It also has high thermal conductivity which, as discussed above, is necessary for the cell barrier. Aluminum alloys have excellent mechanical strength and are therefore excellent cell barrier materials. Appropriate alloys include alloys of aluminum with metals such as chromium (Cr), magnesium (Mg), titanium (Ti), copper (Cu), iron (Fe), manganese (Mn), silicon (Si), and zinc (Zn), but are not limited thereto. The aluminum alloy can also include commercially available Al30 series (96.7 to 99 wt % of Al, 0.05 to 0.2 wt % of Cu, 1 to 1.5 wt % of Mn, and balance of impurity), Al50 series (97 wt % of Al, 0.5 to 1.1 wt % of Mg, 0.2 wt % of Mn, and balance of impurity), Al60 series (95.8 to 98.6 wt % of Al, 0.04 to 0.35 wt % of Cr, 0.15 to 0.4 wt % of Cu, 0.8 to 1.2 wt % of Mg, and balance of impurity), and the like.

However, since aluminum has good electrical conductivity, a cell barrier for the rechargeable battery module according to an aspect of the present invention includes an insulating layer selected from the group consisting of a resin layer, an inorganic oxide layer, an anodized layer, and a composite layer thereof in order to improve the insulating performance. The resin layer may include, but is not limited to, a fluorinated resin, an epoxy resin, or a mixture thereof. The inorganic oxide may include an aluminum oxide and so on.

The anodized layer may be made by anodizing the metal body of a cell barrier composed of aluminum or an aluminum alloy. When the metal body is aluminum, aluminum oxide is formed on the surface of the aluminum on the metal body by an anodizing treatment. Such aluminum oxide has better insulating properties and mechanical properties (such as surface hardness, anti-corrosion, abrasion resistance, and so on) than aluminum metal, and therefore acts as a suitable insulating layer.

The anodizing may be performed in accordance with generally known anodizing methods. The anodized layer is formed on the positive electrode by dipping the positive and negative electrodes into an electrolytic bath containing an acid electrolyte solution, and thereafter performing electrolysis. The positive electrode can be aluminum, while the negative electrode can be a metal with lower oxidation potential than that of aluminum. The metal with lower oxidation potential than that of aluminum can be Zn, Fe, nickel (Ni), Cu, lead (Pb), and the like. According to one embodiment of the present invention, Pb is appropriate.

The acid electrolyte solution can be a sulfuric acid solution, an oxalic acid solution, or a mixed acid solution thereof.

Further, according to the present invention, two or more insulating layers selected from the group consisting of a resin layer, an inorganic oxide layer, and an anodized layer may be laminated to provide a composite layer. For example, an inorganic oxide layer such as aluminum oxide is formed by anodizing, and then an insulating resin layer may be laminated thereon to create the cell barrier.

The thickness of the insulating layer can be within a range imparting a desirable function, generally from 10 to 60 μm. When the thickness of the insulating layer is less than 10 μm, it is difficult to impart sufficient insulating property. When the thickness is more than 60 μm, the cost of the barrier is too high and the barrier is thermally deformed. Also, when an anodized layer is formed in a thickness of more than 60 μm, excessive current during the formation of the anodized layer is required and the anodizing duration is excessively prolonged. According to one embodiment of the present invention, the thickness may range from 20 to 50 μm. According to another embodiment of the present invention, the thickness may range from 30 to 45 μm The breakdown voltage of the insulating layer is another important insulation property and may range from 100V to 1500V. When the breakdown voltage is less than 100V, the insulation property is insufficient for a satisfactory cell barrier. When the breakdown voltage is more than 1500V, the thickness of the insulating layer should be excessively increased so as to obtain the breakdown voltage of 1500V. According to one embodiment of the present invention, the breakdown voltage of the insulating layer may range from 500V to 1200V. According to one embodiment of the present invention, the breakdown voltage of the insulating layer may range from 800V to 1200V.

Figure 1:
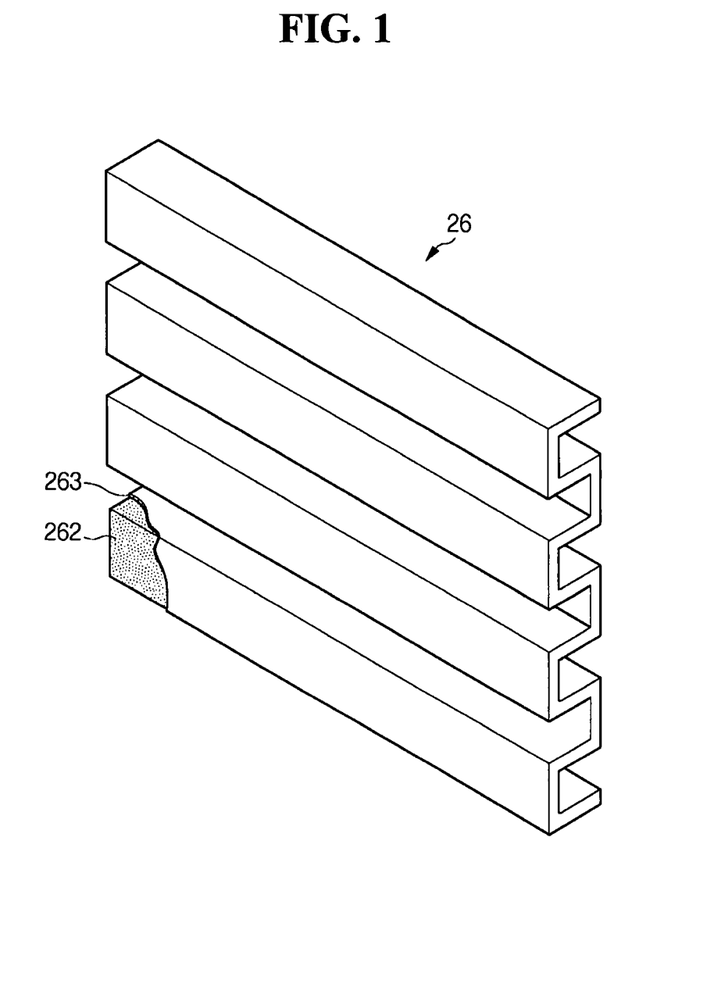
FIG. 1 is a perspective view showing a cell barrier of a rechargeable battery module according to one embodiment of the present invention.

FIG. 1 is a perspective view showing a cell barrier 26 according to one embodiment of the present invention.

Referring to the drawing, the cell barrier 26 has structures such as gaps and spaces, protrusions and depressions, or channels. In order to circulate a heat transfer medium, the structures form passages through the unit cell on sides away from the electrode terminals (see FIG. 3 discussed below) The cell barrier 26 may be formed in various shapes. The shape of the cell barrier 26 shown in FIG. 1 is one example, and the present invention is not limited thereto.

As discussed above, the cell barrier 26 may be made of aluminum or an aluminum alloy.

An insulating layer 263 is formed on one surface 262 of the cell barrier 26 to improve the electrical insulating property, so that the unit cells are electrically connected to each other only via a connector. The insulating layer 263 is selected from the group consisting of a resin layer, an inorganic oxide layer, an anodized layer, and a composite layer thereof.

An aspect of the present invention further provides a rechargeable battery module including the cell barrier for a rechargeable battery module. The rechargeable battery module according to an aspect of the present invention includes a plurality of unit cells disposed leaving a certain space, connectors electrically connecting electrode terminals mounted in the unit cells, and cell barriers disposed between the unit cells to provide a passage for a heat transfer medium. The cell barrier includes an insulating layer and at least one metal selected from the group consisting of aluminum and an aluminum alloy.

The unit cell includes an electrode assembly including a separator and positive and negative electrodes disposed at each side of the separator, a case having a space for housing the electrode assembly, a cap plate combined with the case and thereby closing and sealing it, and positive and negative terminals electrically connected to the electrode assembly.

Figure 2:
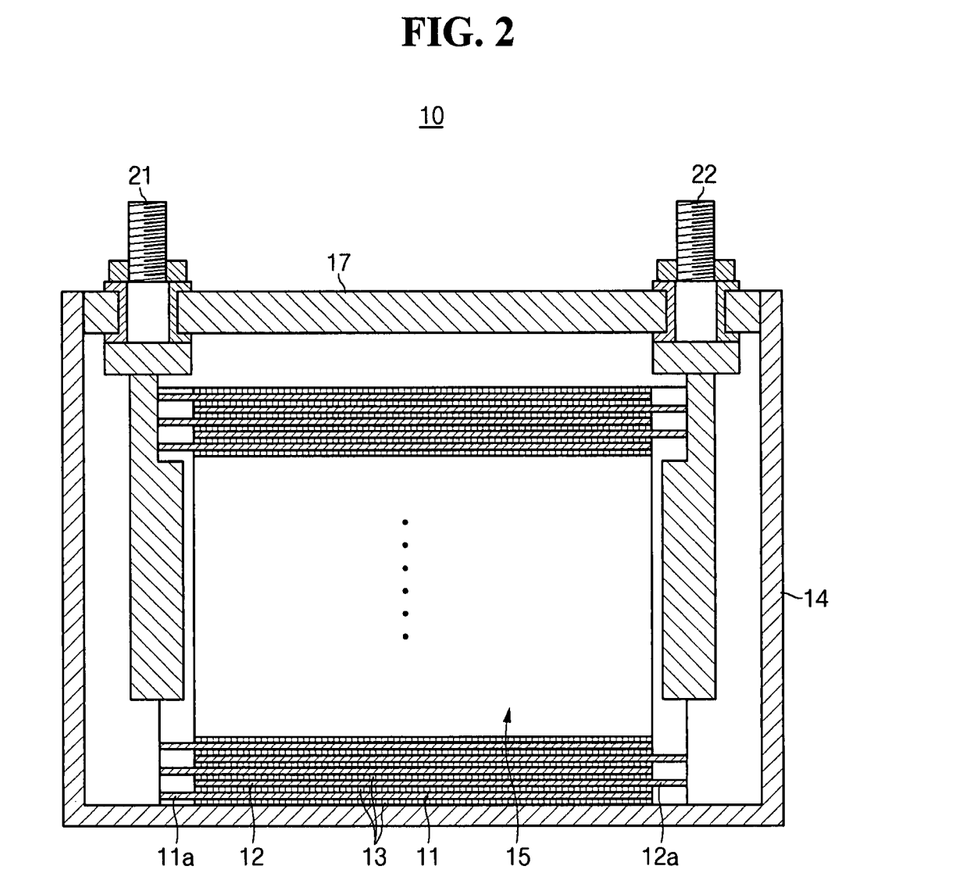
FIG. 2 is a cross-sectional view showing a unit cell according to another embodiment of the present invention.
Figure 3:
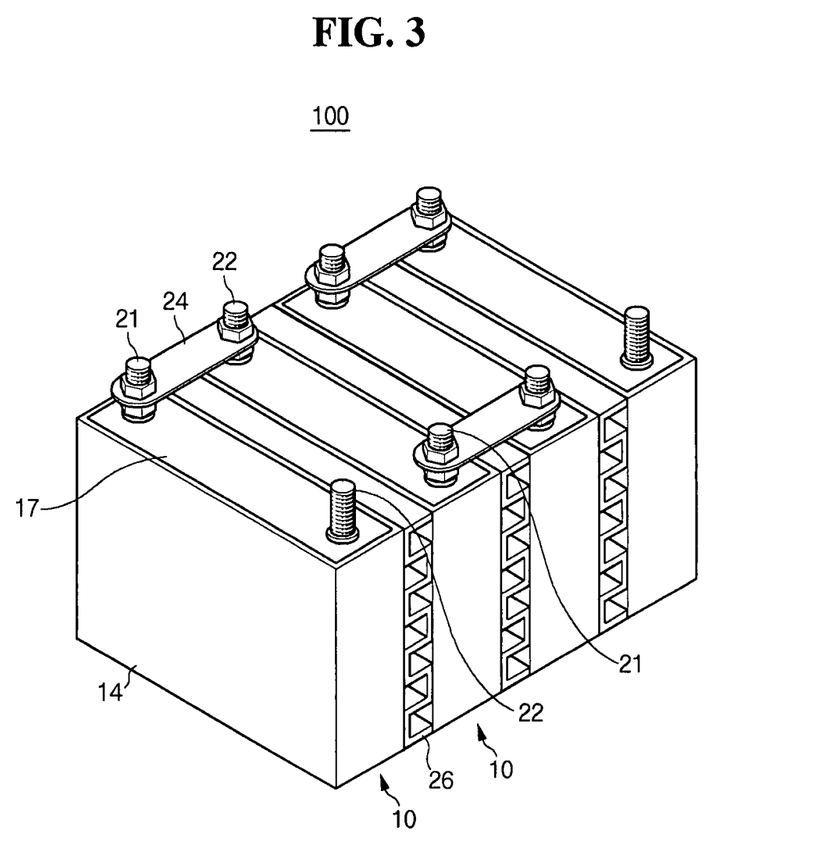
FIG. 3 is a perspective view showing a rechargeable battery module according to another embodiment of the present invention.

FIG. 2 is a cross-sectional view of a unit cell 10 according to one embodiment of the present invention, and FIG. 3 is a perspective view showing a rechargeable battery module 100 according to one embodiment of the present invention.

Referring to the drawings, each unit cell 10 of a battery module 100 with a large capacity includes: an electrode assembly 15, including positive and negative electrodes 11 and 12 and a separator 13 interposed between electrodes 11 and 12; a case 14 having a space for housing the electrode assembly 15; a cap plate 17 combined with the case 14 and thereby closing and sealing the unit cell; and positive and negative terminals 21 and 22 electrically connected to the positive and negative electrodes 11 and 12 and outwardly protruded from the cap plate 17.

Herein, the positive electrodes 11 include a positive current collector formed of a thin metal foil, for example, aluminum foil and the like, and a positive active material coated on at least one side thereof. The positive active material generally is a lithium-based oxide.

The negative electrodes 12 include a negative current collector formed of a thin metal foil, for example, a copper foil and the like, and a negative active material coated on at least one side thereof. The negative active material generally is a carbon material.

In addition, both of the positive and negative electrodes 11 and 12 include coated regions where the current collectors are coated with the active materials and uncoated regions 11a and 12a where the current collectors are not coated with the active materials.

The uncoated regions 11a and 12a are formed on the sides of the positive and negative electrodes 11 and 12 in a lengthwise direction when they are applied to a rechargeable battery with high power. Then, a separator 13 as an insulator is interposed between the positive and negative electrodes 11 and 12, and thereafter, they are all stacked and spiral-wound together into a jellyroll-shaped electrode assembly 15. The electrode assembly 15 can be pressed flat enough to be housed in a case 14.

In addition, the case 14 is formed of a conductive metal such as aluminum, an aluminum alloy, or nickel-plated steel, and is shaped as a quadrangular prism or other shape having a space for housing the electrode assembly 15. As discussed above, appropriate alloys include aluminum alloys with metals such as chromium (Cr), magnesium (Mg), titanium (Ti), copper (Cu), iron (Fe), manganese (Mn), silicon (Si), and zinc (Zn), but are not limited thereto. The aluminum alloy can also include commercially available Al30 series, Al50 series, Al60 series, and the like.

A plurality of unit cells 10 are joined together to provide a rechargeable battery module 100. The rechargeable battery module 100 includes a plurality of unit cells 10 disposed leaving space between each unit cell, cell barriers 26 disposed in the spaces between the unit cells 10 to provide a passage for a heat transfer medium, and connectors 24 electrically connecting between the positive and negative terminals 21 and 22 mounted in the unit cells 10.

The cell barriers 26 have excellent thermal conductivity sufficient to effectively cool down each unit cell 10 and also have an insulating property so that unit cells 10 are connected to each other only via connectors 24.

Figure 4:
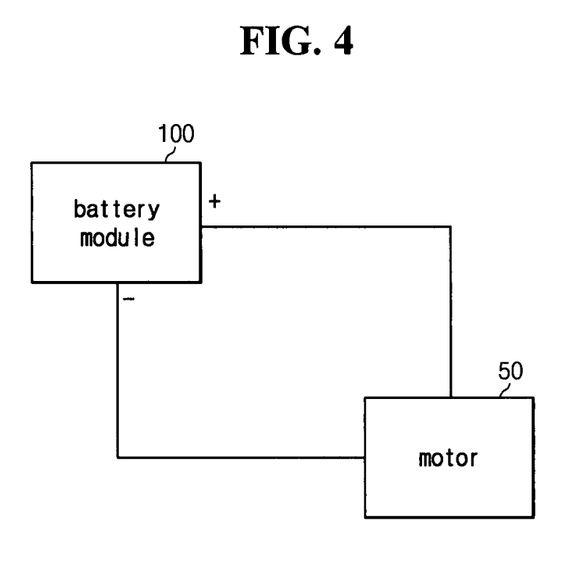
FIG. 4 is a schematic block diagram illustrating how a rechargeable battery module is connected with a motor according to another embodiment of the present invention.

The rechargeable battery module can be used as a power source for driving the motor of a variety of electric devices such as a hybrid electric automobile (HEV), an electric vehicle (EV), a cordless vacuum cleaner, a motor bike, an electric scooter, and the like. FIG. 4 is a schematic block diagram illustrating how a rechargeable battery module is connected with a motor according to one embodiment of the present invention. As shown in FIG. 4, the rechargeable battery module 100 may be connected to a motor 50 and thereby used as a power source for a motor of electric devices.

The following examples illustrate the present invention in more detail. However, it is understood that the present invention is not limited by these examples.

Example 1

The corrugated aluminum cell barrier was fabricated as shown in FIG. 1, and then impurities, such as an oxide, were removed. Subsequently, the aluminum cell barrier was introduced at a positive electrode in an electrolytic bath filled with 17 wt % of a sulfuric acid aqueous solution and copper was used as a negative electrode. Then, electrolysis was performed to form an anodized layer on the aluminum cell barrier. The anodized layer was formed at thicknesses of 29 μm, 32 μm, 46 μm (two times), 49 μm, 50 μm, 61 μm (two times), and 72.5 μm, depending on the electrolysis time.

Example 2

The corrugated aluminum cell barrier as shown in FIG. 1 was fabricated and subjected to the following process where impurities, such as an oxide, were removed. Then, an aluminum oxide coating layer was formed on the cell barrier in thicknesses of 28 μm, 34 μm, and 41 μm.

Example 3

The corrugated aluminum cell barrier as shown in FIG. 1 was fabricated and subjected to the following process where impurities, such as an oxide, were removed. Then, a TEFLON® (polytetrafluoroethylene) solution was coated on the cell barrier and dried to provide a TEFLON® (polytetrafluoroethylene) resin coating layer at thicknesses of 45 μm, 50 μm, and 61 μm.

In order to determine the insulating property of the cell barrier having the insulating layer according to Examples 1 to 3, the voltage was increased at a current of 100 mA to measure the breakdown voltage. The breakdown voltage was considered to have occurred when a surface short occurred or the surface insulating layer was damaged. The results are shown in FIGS. 5 and 6.

Figure 5:
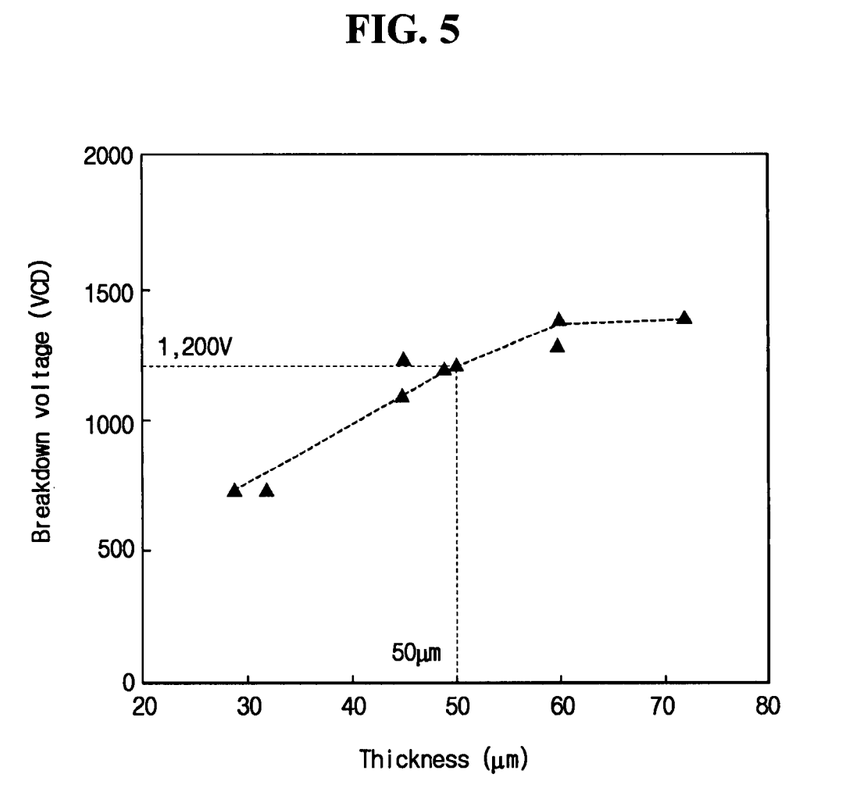
FIG. 5 is a graph showing the breakdown voltage as a function of thickness of an anodized layer of the cell barrier according to Example 1.

FIG. 5 is a graph showing the breakdown voltage of the cell barrier coated with the anodized layer according to Example 1. It can be seen that the breakdown voltage increases as the thickness of the anodized layer increases. When the anodized layer has a thickness of 50 μm, the breakdown voltage occurs at 1200V. From the example, it is estimated that the breakdown voltage will occur at 1000V or more when the thickness is increased to 40 μm or more. Accordingly, it is confirmed that the anodized layer has an excellent insulating property.

Figure 6:
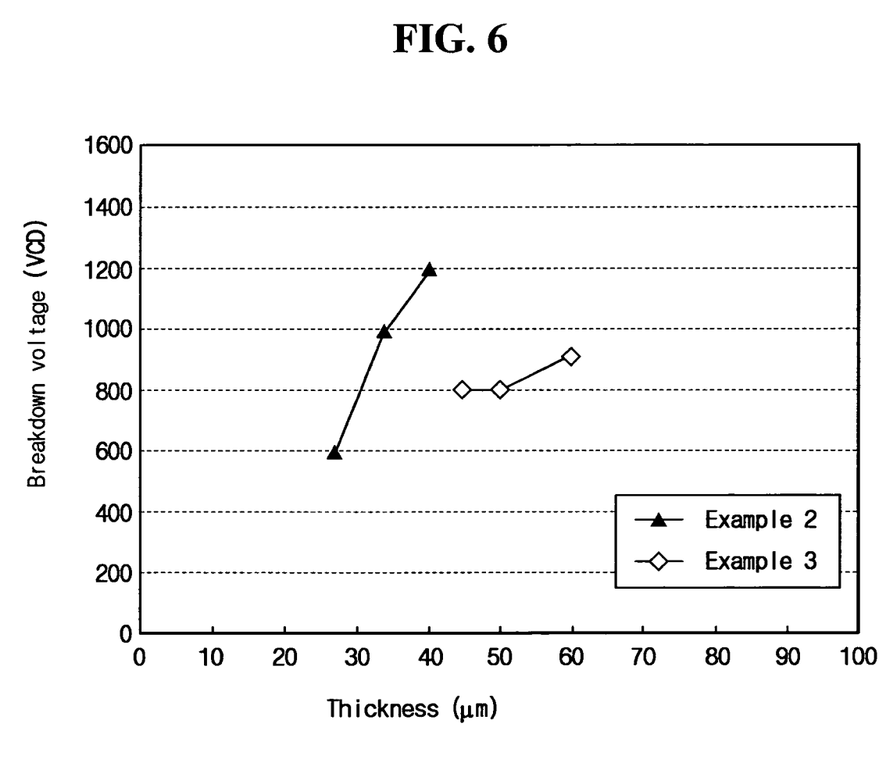
FIG. 6 is a graph showing breakdown voltages as a function of thickness of the cell barrier according to Examples 2 and 3.

FIG. 6 is a graph showing the breakdown voltage of cell barriers according to Examples 2 and 3. When the inorganic oxide coating layer of Example 2 had a thickness of 34 μm, the breakdown voltage was 1000V and when the coating layer was 41 μm, the breakdown voltage was 1200V.

It is possible for the cell barrier coated with TEFLON® (polytetrafluoroethylene) according to Example 3 to have a thickness of at least 61 μm. When the thickness was 61 μm, the breakdown voltage was 900V.

It is therefore confirmed that all the cell barriers according to Examples 1 to 3 have excellent insulating properties. Specifically, the battery cell barrier coated with the anodized layer according to Example 1 had superior insulating property to those of Examples 2 and 3.

The cell barrier for a rechargeable battery module has excellent cooling performance due to good heat-conductivity and it includes an insulating layer, having an excellent insulating property. Therefore, the cell barrier can prevent a short circuit between unit cells. The cell barrier also has excellent mechanical properties such as hardness, anti-corrosion, abrasion resistance, and so on.

While this invention has been described in connection with what is presently considered to be practical exemplary embodiments, it would be appreciated by those skilled in the art that the invention is not limited to the disclosed embodiments without departing from the principles and spirit of the invention, but, on the contrary, is intended to cover various modifications and equivalent arrangements included within the spirit and scope of the appended claims and their equivalents.

What is claimed is:

1. A rechargeable battery module comprising:
   a plurality of unit cells electrically coupled to each other with a predetermined interval, each of the plurality of unit cells having a quadrangular prism shape having a length and a height, the length being greater than the height; and
   a cell barrier interposed between and contacting at least two adjacent ones of the unit cells and electrically insulating the at least two adjacent ones of the unit cells from each other, the cell barrier having a length and a height, the length of the cell barrier being greater than the height of the cell barrier, the height of the cell barrier being the same as the height of each of the plurality of unit cells,
   wherein
   the cell barrier comprises: a corrugated metal body having a plurality of first channels at a first side having open sides that face one of the at least two adjacent ones of the unit cells and a plurality of second channels at a second side having open sides that face another one of at least two adjacent ones of the unit cells, each of the first and second channels constituting a passage for a heat transfer medium, and an insulating layer formed directly and disposed on a surface of the metal body facing the unit cells and disposed in the plurality of first channels and the plurality of second channels, the plurality of first channels and the plurality of second channels being parallel to each other in a plane, each of the first and second channels of the cell barrier extending parallel to a length direction of each of the plurality of unit cells,
   the insulating layer is selected from the group consisting of an inorganic oxide layer, an anodized layer, and a composite layer thereof, and the anodized layer is formed by electrolysis in an electrolytic bath including an acid electrolyte solution, and
   the acid electrolyte solution is selected from the group consisting of a sulfuric acid solution and an oxalic acid solution.

2. The cell barrier of claim 1, wherein the insulating layer has a thickness ranging from 20 to 50 μm.

3. The cell barrier of claim 1, wherein the insulating layer has a thickness ranging from 30 to 45 μm.

4. The rechargeable battery module of claim 1, wherein the metal body comprises at least one selected from the group consisting of aluminum, an aluminum alloy, and combinations thereof.

5. The rechargeable battery module of claim 1, wherein the inorganic oxide is an aluminum oxide.

6. The rechargeable battery module of claim 1, wherein the insulating layer has a thickness ranging from 10 to 60 μm.

7. The rechargeable battery module of claim 1 wherein each unit cell comprises:
   an electrode assembly comprising a positive electrode, a negative electrode, and an insulating separator interposed between the positive and negative electrodes;
   a case having a space for housing the electrode assembly;
   a cap plate connected to the case, to close and seal the electrode assembly within the case;
   a positive terminal electrically connected to the positive electrode and outwardly protruding from the cap plate; and
   a negative terminal electrically connected to the negative electrode and outwardly protruding from the cap plate.

* * * * *